US008539278B2

(12) United States Patent
Brewerton et al.

(10) Patent No.: US 8,539,278 B2
(45) Date of Patent: Sep. 17, 2013

(54) METHODS AND SYSTEMS FOR MEASURING I/O SIGNALS

(75) Inventors: Simon Brewerton, Trowbridge (GB); Patrick Leteinturier, Munich (DE); Oreste Bernardi, Munich (DE); Antonio Vilela, Mering (DE); Klaus Scheibert, Grasbrunn (DE); Jens Barrenscheen, Munich (DE)

(73) Assignee: Infineon Technologies AG, Neubiberg (DE)

( * ) Notice: Subject to any disclaimer, the term of this patent is extended or adjusted under 35 U.S.C. 154(b) by 328 days.

(21) Appl. No.: 12/915,396

(22) Filed: Oct. 29, 2010

(65) Prior Publication Data

US 2012/0110374 A1    May 3, 2012

(51) Int. Cl.
*G06F 11/00*    (2006.01)

(52) U.S. Cl.
USPC ............................. 714/5.11; 714/33; 714/48

(58) Field of Classification Search
USPC ............................................ 714/5.11, 33, 48
See application file for complete search history.

(56) References Cited

U.S. PATENT DOCUMENTS

| 5,453,995 | A | * | 9/1995 | Behrens | 714/743 |
| 6,044,489 | A | * | 3/2000 | Hee et al. | 714/815 |
| 6,128,754 | A | * | 10/2000 | Graeve et al. | 714/39 |
| 7,404,109 | B2 | * | 7/2008 | Hildebrant et al. | 714/700 |

* cited by examiner

*Primary Examiner* — Charles Ehne
(74) *Attorney, Agent, or Firm* — Eschweiler & Associates, LLC

(57) ABSTRACT

Some embodiments of the invention relate to an embedded processing system. The system includes a memory unit to store a plurality of operating instructions and a processing unit coupled to the memory unit. The processing unit can execute logical operations corresponding to respective operating instructions. An input/output (I/O) interface receives a first time-varying waveform and provides an I/O signal that is based on the first time-varying waveform. A comparison unit coupled to the processing unit and adapted to selectively assert an error signal based on whether the I/O signal has a predetermined relationship with a reference signal, wherein the predetermined relationship holds true during normal operation but fails to hold true when an unexpected event occurs and causes an unexpected change at least one of the I/O signal and reference signal.

22 Claims, 8 Drawing Sheets

METHODS AND SYSTEMS FOR MEASURING I/O SIGNALS

BACKGROUND

Safety engineering is a growing field in which engineers use redundancy techniques in order to mitigate adverse consequences if an error occurs. For example, space vehicles and many aircraft include redundant systems so that if an engine control component fails during flight, for example, another engine control component can be activated to allow the aircraft to land safely.

In a similar regard, timed input/output (I/O) signals in safety conscious systems can be generated and then subsequently checked to ensure they were actually delivered correctly. This can be useful in any number of applications. For example, in an automotive system, if an output drive signal (e.g., sparkplug signal from an engine controller) is provided to an automobile's engine, a feedback signal (which is derived from the output drive signal that was actually delivered to the engine) can be compared with the original output drive signal to determine whether the output drive signal was, in fact, delivered correctly. Thus, if there is a "bad" connection between the engine controller and the engine itself (or if some other error event occurs), a comparison of the original drive signal and the feedback signal can detect this error, thereby allowing a control system to notify the driver, for example, by illuminating a "check engine" light on the driver's dashboard. In this way, a driver can be informed that an engine problem (e.g., a sparkplug misfire) has occurred, and can then get the vehicle serviced to remedy any corresponding problems.

Although conventional timed I/O techniques are sufficient in some instances, the inventors have appreciated that they are less than ideal in many cases. For instance, in previous timed I/O solutions, software in the form of an interrupt service routine (ISR) compares the output drive signal and feedback signal at each and every edge of the output drive signal. Because the ISR is carried out for each and every edge of the output drive signal, the repeated ISRs represent a significant load on the system's microprocessor. As such, the inventors have appreciated that ISRs create a processing bottleneck for many existing control systems. Because of this, the inventors have devised improved techniques for generating and measuring timed I/O signals.

DETAILED DESCRIPTION

Figure 1:
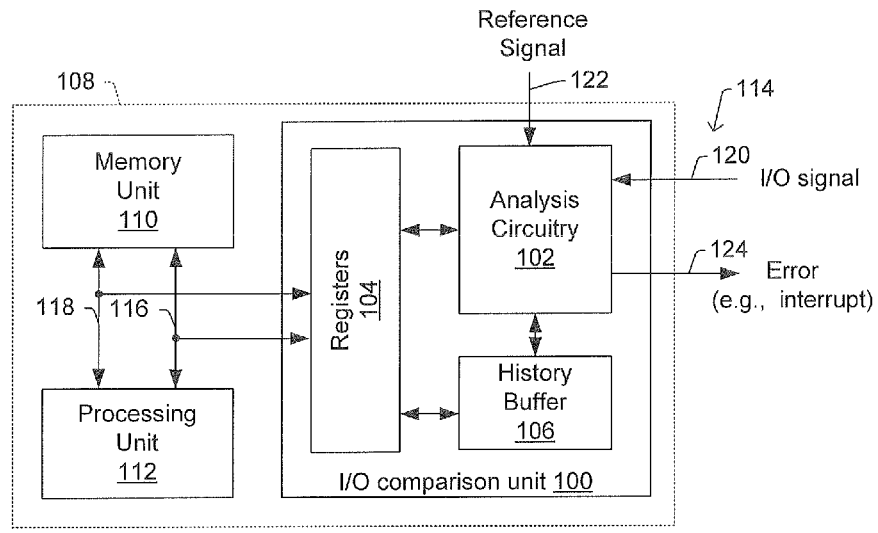
FIG. 1 is a block diagram illustrating an I/O comparison unit in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Some embodiments of the present disclosure relate to an I/O comparison unit for measuring I/O signals. The I/O comparison unit is implemented as a hardware module within an embedded system, such as an automotive or industrial system, and monitors timed I/O signals for errors. Whereas some previous solutions processed an interrupt on each and every output signal edge (which, as appreciated by the inventors, acts as a processing "bottleneck" in many regards), the inventive I/O comparison unit can monitor timed I/O signals in a relatively autonomous manner, and assert an interrupt only when the I/O comparison unit detects an error in the I/O signals. This can result in a reduction in the amount of interrupt processing, relative to previous solutions.

Among other things, this reduction in interrupt processing allows the system to increase the frequency of the timed I/O signals (e.g., because the spacing between edges for the signals can now be more closely spaced without overloading the processor). In automotive applications, this frequency increase can "smooth" out an engine drive signal and allows each pulse of the drive signal to deliver less power to the motor than previous implementations. By using slightly less power with each pulse to the motor, lower power devices can be used in the vehicle, which can potentially increase the number of miles per gallon achieved in electric and hybrid cars for example, as well as providing other benefits in cars and/or other systems.

Referring now to FIG. 1, one can see an I/O comparison unit 100 in accordance with some embodiments. The I/O comparison unit 100 includes analysis circuitry 102, a bank of registers 104, and a history buffer 106, and is part of an embedded system 108, which includes a memory unit 110, a processing unit 112, and an I/O interface 114. A control bus 116 and data bus 118 operably couple these components, however, it will be appreciated that the illustrated bus configuration is merely an example bus configuration and any number of other bus configurations are contemplated as falling within the scope of this disclosure. In some implementations the entire embedded system 108 is formed on a single integrated circuit, although the embedded system 108 can also be distributed among several different integrated circuits as well.

During operation, the memory unit 110 stores a number of operating instructions (e.g., software or firmware instructions), which are retrieved and executed by the processing unit 112. These instructions can cause the processing unit 112 (or some other component) to write to the bank of registers 104, thereby causing the analysis circuitry 102 to monitor an I/O signal 120 on the I/O interface 114. Based on whether the I/O signal 120 has a predetermined relationship with a reference signal 122, the I/O comparison unit 100 selectively asserts an error signal 124, such as an interrupt.

Typically, an unexpected event (e.g., an alpha-particle striking the comparison unit 100, a loose connection, or a faulty transistor) can cause an unexpected change in the I/O signal 120 and/or reference signal 122. Under normal operation, the I/O signal 120 and reference signal 122 exhibit a predetermined relationship, however, in the wake of the unexpected event the predetermined relationship no longer holds true. Thus, based on whether the predetermined relationship is met, the analysis circuitry 102 can trigger the error signal 124 so suitable corrective action can be taken.

In some embodiments, rather than asserting the error signal 124 for each unexpected event, the history buffer 106 can store a number of comparisons (e.g., corresponding to a number of unexpected events/errors) for further analysis. The analysis circuitry 102 can then examine the number of unexpected events/errors within a given time interval or within a given number of comparisons. In this way, the error signal 124 can also be asserted based on an analysis of a number of unexpected events and relationships therebetween, rather than simply based on the occurrence of a single unexpected event.

Several more detailed methods for signal comparison are discussed further herein with regards to FIGS. 5-11. However, before discussing these more detailed methods, several different embedded system configurations that include an I/O comparison unit (e.g., I/O comparison unit 100 of FIG. 1) are described with regards to FIGS. 2-4. As will be appreciated in more detail below, in each of these configurations the I/O comparison unit is coupled to first and second waveform generators that generate first and second time-varying waveforms, respectively. The I/O comparison unit selectively asserts an error signal based on whether the first and second waveforms exhibit a predetermined relationship therebetween. Although each of these embedded system configurations typically includes a processing unit and memory unit (e.g., as shown in FIG. 1), these components are omitted from FIGS. 2-4 for purposes of clarity. In addition, it will be appreciated that the first and second waveforms and I/O and reference signals can be interchanged in a variety of ways other than those illustrated.

Figure 2:
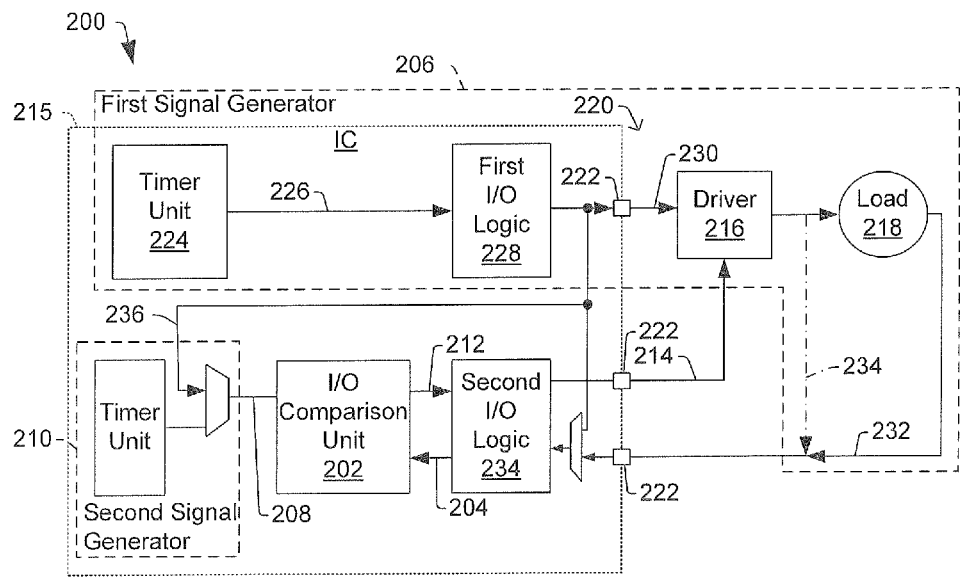
FIGS. 2-4 illustrate block diagrams of embedded system configurations in accordance with some embodiments, wherein each embedded system configuration includes an I/O comparison unit.

FIG. 2's embedded system 200 includes an I/O comparison unit 202 that compares an I/O signal 204 from a first signal generator 206 with a reference signal 208 from a second signal generator 210. Based on this comparison, the I/O comparison unit 202 selectively asserts an error signal 212, which can manifest itself as an interrupt on line 214 so actions can be taken to remedy any detected error. In the illustrated embodiment, several of illustrated components are formed on an integrated circuit (IC) 215, while others (e.g., driver 216 and load 218) are external to the IC and coupled thereto via an I/O interface 220 that includes a number of external IC pins 222.

More particularly, the first signal generator 206 includes a microprocessor (not shown) that programs a first timer unit 224 to provide a command signal 226 to a first I/O logic block 228. Based on the command signal 226, the first I/O logic block 228 generates an output drive signal 230 (e.g., a pulse-width modulated signal), which is then provided to the driver 216. A first time-varying waveform 232, which is indicative of the drive signal provided by the driver 216, is then received at a second I/O logic block 234. Based on the first time-varying waveform 232, the second I/O logic block 234 provides the I/O signal 204, which is received by the I/O comparison unit 202.

The I/O comparison unit 202 then compares the I/O signal 204 to the reference signal 208, which may also be referred to as a second time-varying waveform. The second time-varying waveform is expected to be the shaped similarly to the first time-varying waveform 232 within some tolerable delay at the waveform edges, but can differ from the first time-varying waveform in the case of an unexpected event (e.g., alpha particle or "bad" connection). If the I/O signal 204 and reference signal 208 differ according to some predetermined relationship, the I/O comparison unit 202 selectively asserts the error signal 212. In some instances the error signal 212 can be used to disable the driver 216, while in other embodiments more passive remedies are taken (e.g., the error signal is used to activate an audio or visual warning signal).

In some implementations, an error signal is used to generate an interrupt provided on a dedicated interrupt line. If present, this interrupt line can be coupled to the processing unit (e.g., processing unit 112 in FIG. 1), or can be provided to an external IC pin 222. Because the external IC pin can be monitored by an external circuit, such a configuration allows the error signal to be processed even if an on-chip processing unit (e.g., processing unit 112 in FIG. 1) is busy or unavailable to process the error signal.

Although an illustrative I/O signal 204 and reference signal 208 have been described above, it will be appreciated that the I/O signal and reference signal can be taken from other parts of the embedded system in other implementations. For example, rather than the I/O signal 204 being based on a signal downstream of the load (signal 232), the I/O signal 204 can be based on the signal expected to be delivered to the load (e.g., signal 234 or some other signal upstream of the load 218). Also, although the illustrated reference signal 208 has been discussed as being provided by a timer module, the reference signal could also be the drive signal or some other signal upstream of the I/O signal (e.g., as shown by line 236). In such a case, the I/O comparison unit can measure a signal expected to be delivered to the load (e.g., on line 236) with a signal actually delivered to the load (e.g., 232). Other variations are also contemplated as falling within the scope of this disclosure.

Figure 3:
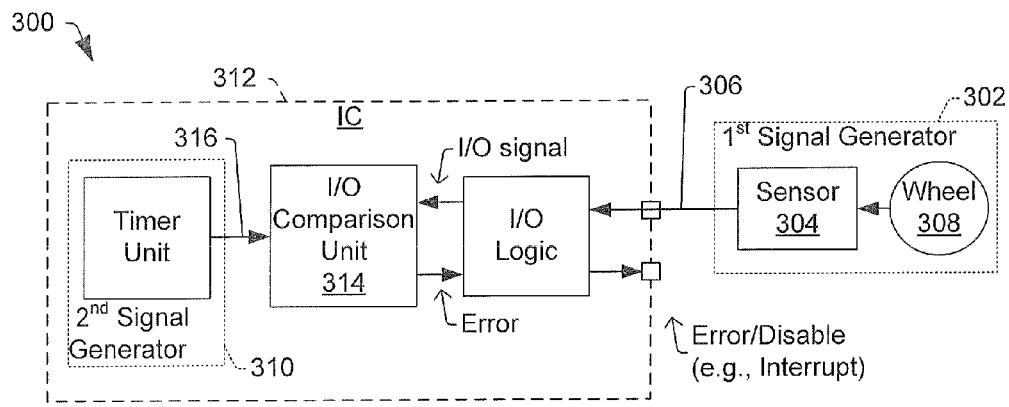

FIG. 3 shows another embedded system configuration 300, wherein the first signal generator 302 includes a wheel sensor 304 that generates a first time-varying waveform 306 based on a characteristic of the wheel 308 (e.g., wheel speed). The second signal generator 310 in this embodiment is again located on an IC 312 that includes the comparison unit 314, and includes a timer unit, which is programmed to deliver the reference signal 316 according to some programmed values.

Figure 4:
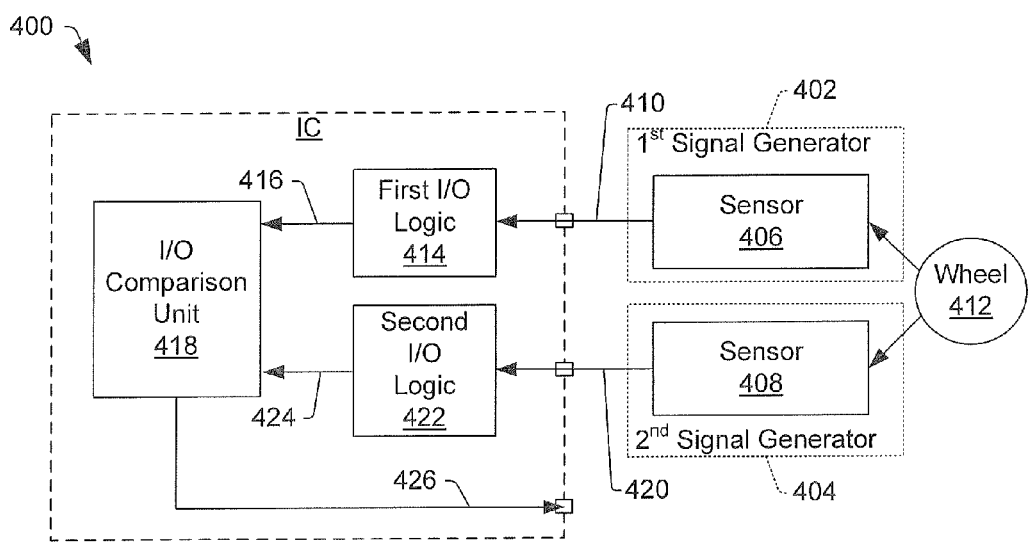

FIG. 4 shows still another embedded system configuration 400 where the first and second signal generators (402, 404, respectively) comprise first and second wheel sensors (406, 408, respectively). In this example, the first signal generator 402 delivers a first waveform 410, which is for example indicative of the speed of the wheel 412, to the first I/O logic block 414. The first I/O logic block 414, in turn, delivers a corresponding I/O signal 416 to the I/O comparison unit 418. The second signal generator 404 delivers a second waveform 420, which is also for example indicative of the speed of the wheel 412, to a second I/O logic block 422. The second I/O logic block 422 delivers a corresponding reference signal 424 to the I/O comparison unit 418. Under normal conditions, corresponding edges of the I/O signal 416 and reference signal 424 are within some predetermined tolerance, and no error signal is generated. In such an instance, the I/O comparison unit 418 continues to monitor the waveforms without generating an interrupt, thereby reducing interrupt processing relative to previous solutions where an interrupt was generated on each and every waveform pulse. By contrast, if the I/O signal 416 and reference signal 424 differ according to some predetermined relationship, an error signal 426 and corresponding interrupt request is asserted.

FIGS. 5-12 show various methods in accordance with some embodiments. While these methods are illustrated and described below as a series of acts or events, the present disclosure is not limited by the illustrated ordering of such acts or events. The same is true for other methods disclosed herein. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases. It will be appreciated that the embedded systems described above with respect to FIGS. 1-4 can include suitable hardware and/or software to implement these methods.

Figure 5:
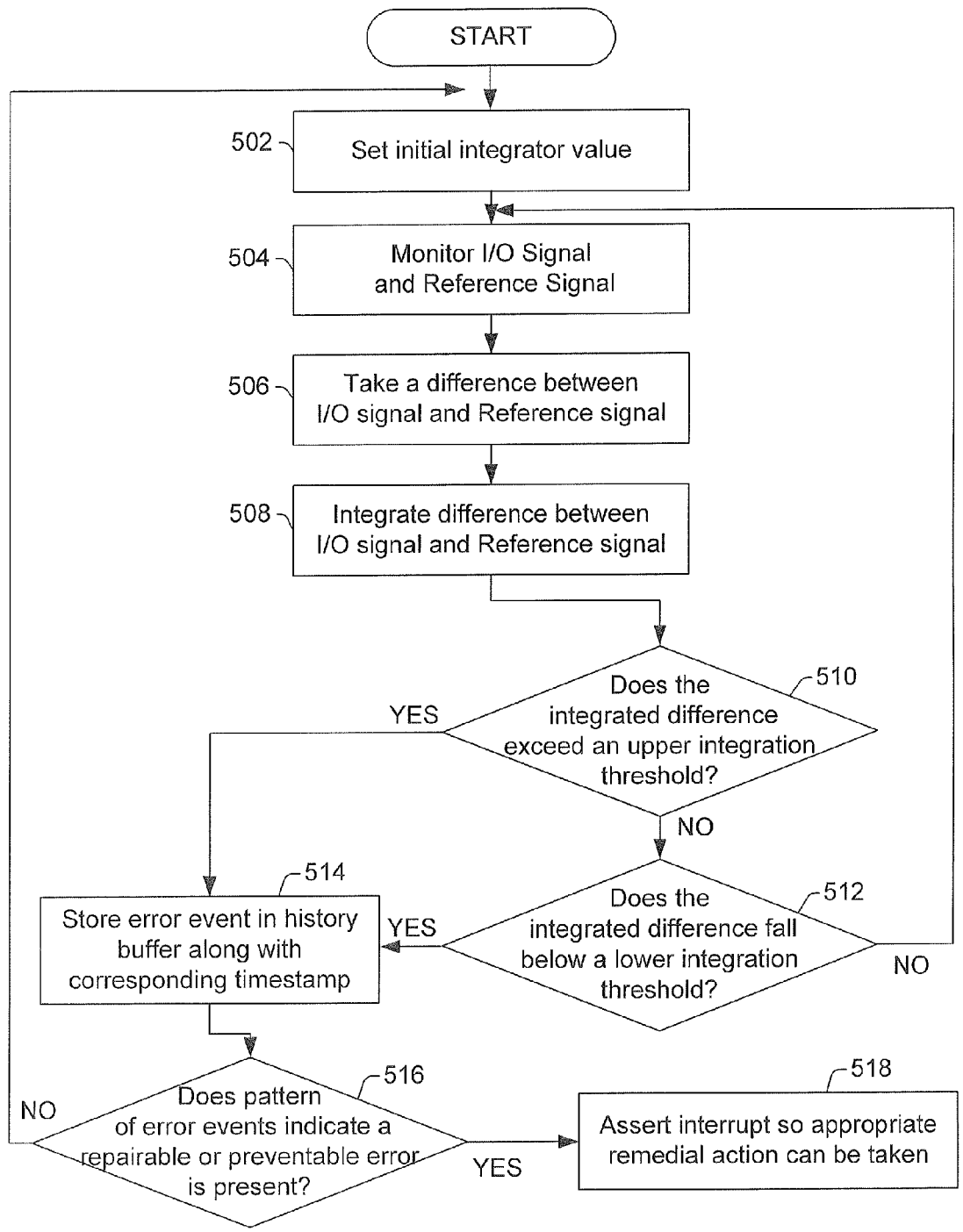
FIG. 5 is a flow chart depicting a method in which integration is used in accordance with some embodiments.

FIGS. 5-6 relate to timed I/O measurement techniques that utilize integration to determine whether an error has occurred. FIG. 5 shows a methodology 500 in flowchart format, while FIG. 6 shows an example waveform consistent with FIG. 5's methodology.

After setting an initial integrator value in 502, FIG. 5's method starts at 504 when voltage and/or current levels of an I/O signal and a reference signal are monitored.

At 506, the method takes a difference between the voltage or current level of the I/O signal and the voltage or current level of the reference signal. The difference is taken at a number of different times that are spread over a time period.

At 508, the method integrates the differences between the I/O signal and the reference signal over the time period.

At 510, the method determines whether the integrated difference exceeds an upper integration threshold. If not ("NO" at 510), the method continues to block 512 and determines whether the integrated difference exceeds a lower integration threshold. If not ("NO" at 512), the method assumes no errors are present and continues processing the signals as shown in blocks 502-506.

However, if the integrated difference exceeds the upper integration threshold ("YES" at 508) or falls below the lower integration threshold ("NO" at 510), the method stores an error event and corresponding timestamp in the history buffer in block 514.

In 516, the method then analyzes the pattern of error events to determine whether a true error condition is present. For example, in some embodiments the timestamps of error events can be analyzed relative to other error event timestamps and an interrupt is only asserted if these errors are collectively indicative of a repairable error condition (e.g., a "bad" electrical connection or faulty transistor, which can be repaired and prevented in the future). In contrast, if the timestamps indicate the errors are random (e.g., due to alpha particles) the method may assign a different priority level to the error event, indicating that the error event is likely not repairable or preventable.

If a repairable or preventable error is detected, an interrupt request is generated by the I/O comparison unit at 518. Appropriate remedial action can be taken by a processor, for example, upon receipt of the interrupt.

Figure 6A:
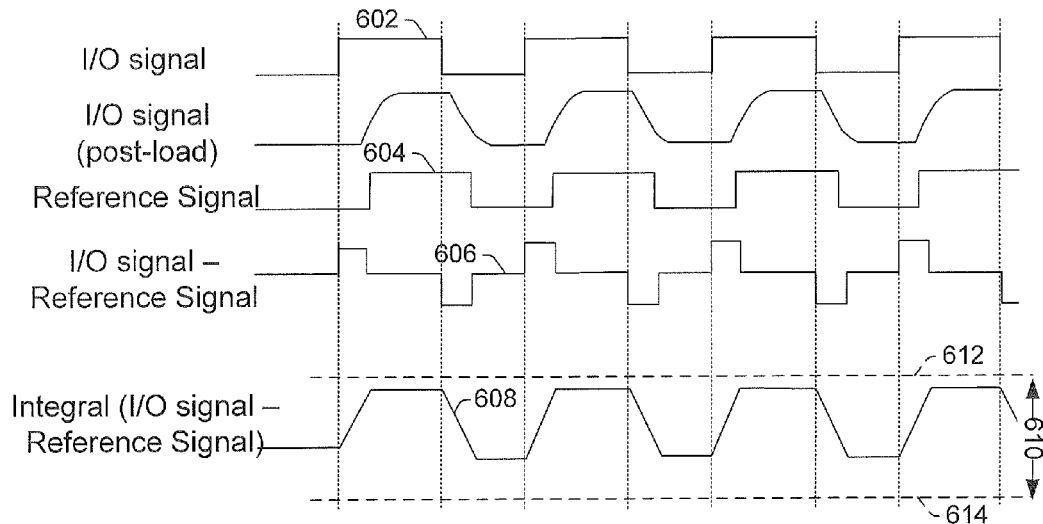
FIGS. 6A-6B show example waveforms to illustrate FIG. 5's flowchart.
Figure 6B:
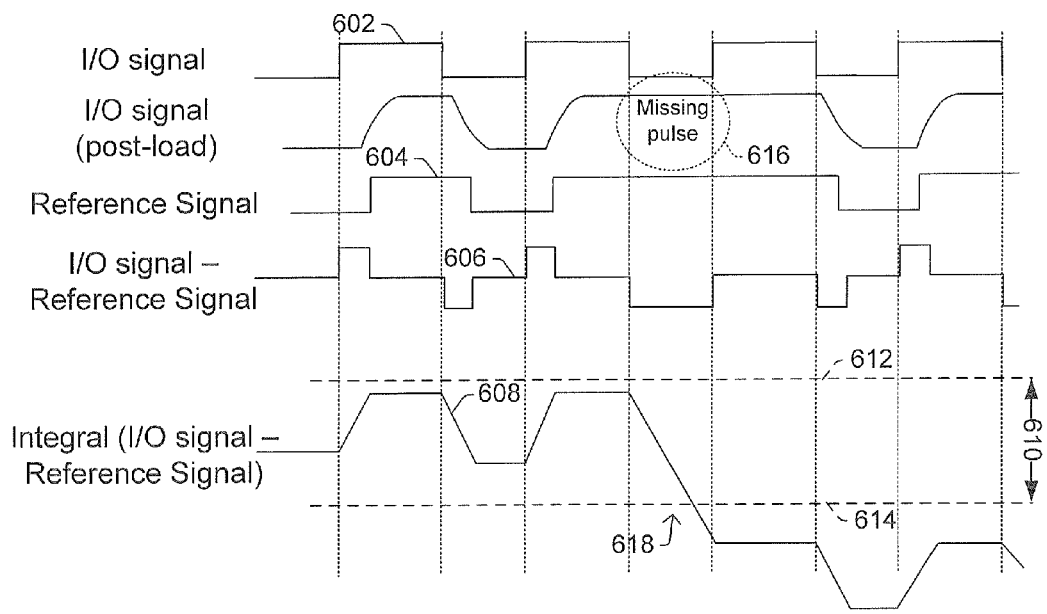

FIGS. 6A-6B shows a series of example waveforms consistent with FIG. 5's methodology 500. As will be appreciated in more detail below, FIG. 6A-6B are discussed below with regards to FIG. 2's embodiment, wherein the I/O signal 602 and reference signal 604, respectively in FIG. 6; correspond to I/O signal 204/234 and reference signal 236, respectively of FIG. 2.

As shown in FIG. 6A-6B, the method takes a difference between the I/O signal 602 and reference signals 604, thereby generating a difference signal 606. The difference signal is integrated to provide an integrated difference waveform 608, and an error signal can be generated based on whether the integrated difference 608 has a predetermined relationship with an expected integration window 610. For example, an error can be asserted if the integrated difference 608 exceeds an upper integration threshold 612 or falls below a lower integration threshold 614. FIG. 6A shows normal operation where no errors are detected, while FIG. 6B shows an example wherein a missing pulse 616 in the I/O signal causes the integrated difference signal 608 to fall below the lower integration threshold 614 at time 618. Thus, in FIG. 6B an error event signal, such as an interrupt, can be generated so the error condition can be suitably dealt with.

Figure 7:
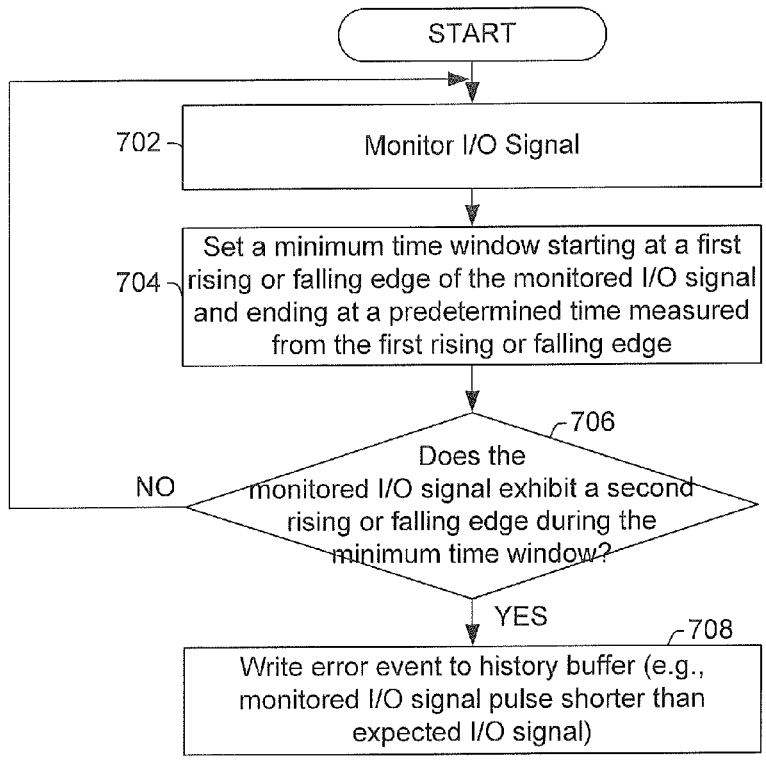
FIG. 7 is a flow chart depicting a method in which a minimum time window as measured from a rising or falling edge is utilized in accordance with some embodiments.
Figure 8:
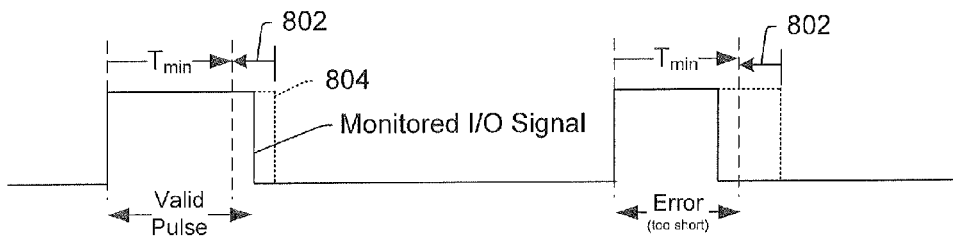
FIG. 8 shows some example waveforms to illustrate FIG. 7's flowchart.

FIGS. 7-8 relate to timed I/O measurement techniques that utilize a time window to determine whether a timed signal is unacceptably shorter than expected. FIG. 7 shows a method 700 in flowchart form, while FIG. 8 shows some sample waveforms consistent with FIG. 7's methodology.

FIG. 7's method 700 starts at 702, wherein an I/O signal is monitored.

At 704 (FIG. 7), the method sets a minimum time window (e.g., $T_{min}$ in FIG. 8), which starts at one type of edge (e.g., a first rising or falling edge of the monitored I/O signal) and ends at a predetermined time measured from the rising or falling edge. The end of the minimum time window corresponds to a maximum acceptable time deviation (e.g., 802, FIG. 8) from an expected I/O signal edge (e.g., FIG. 8, 804). In FIG. 8's example, the monitoring expected I/O signal edge is opposite (e.g., falling) with regards to the edge indicating the start of the time window (e.g., rising). In some instances, the same type of edge is used to start the window and to monitor the edge, and the pulse check is a frequency check. Although FIG. 8 only shows one check, it will be appreciated that a number of these checks can be carried out in parallel, with the length of the high or low time or frequency covering different failure mechanisms.

At 706 (FIG. 7), the method 700 determines whether the monitored signal exhibits a second rising or falling edge during the minimum time window. If so ("YES" at 706) an error signal can be asserted in 708, otherwise monitoring can simply continue at 702-706. Note that the second edge need not be consecutive with the first edge, but rather can be a predetermined number of state changes removed from the first rising or falling edge.

As shown in the first portion of FIG. 8, if a second rising edge occurs within the maximum acceptable time deviation 802, the waveform pulse is considered to be a valid pulse. However, if a second rising edge occurs within the minimum time window $T_{min}$ (i.e., outside of the maximum acceptable time deviation 802), then an error is detected. In the example of FIG. 8, the error occurs because the monitored I/O signal is too short.

Figure 9:
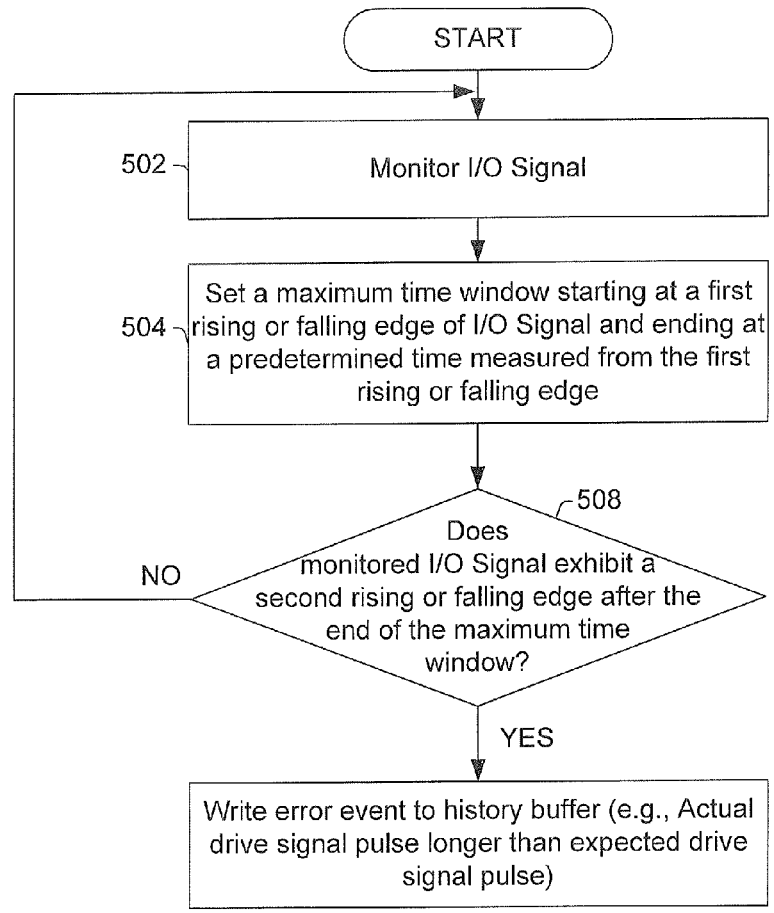
FIG. 9 is a flow chart depicting a method in which a maximum time window as measured from a rising or falling edge is utilized in accordance with some embodiments.
Figure 10:
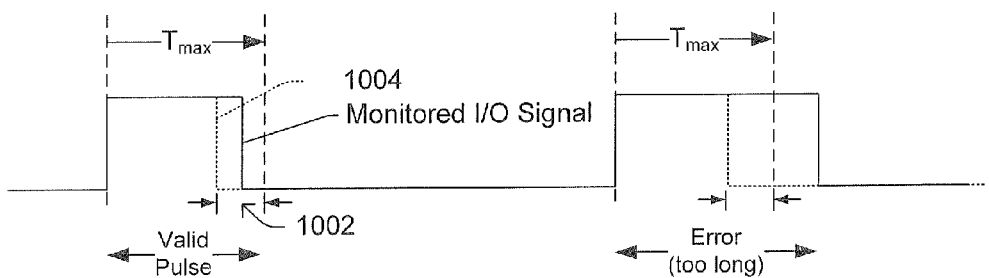
FIG. 10 shows some example waveforms to illustrate FIG. 9's flowchart.

FIGS. 9-10 relate to timed I/O measurement techniques that utilize a time window to determine whether a timed signal is unacceptably longer than expected. FIG. 9's method 900 starts at 902, wherein an I/O signal is monitored.

At 904 (FIG. 9), the method sets a maximum time window (e.g., $T_{max}$ in FIG. 10), which starts at a first rising or falling edge of the monitored I/O signal and ends at a predetermined time measured from the rising or falling edge. The end of the maximum time window corresponds to a maximum acceptable time deviation (e.g., 1002, FIG. 10) from an expected I/O signal edge (e.g., FIG. 10, 1004).

At 906 (FIG. 9), the method 900 determines whether the monitored signal exhibits a second rising or falling edge beyond the maximum time window. If so ("YES" at 906) an error signal can be asserted in 908, otherwise monitoring can simply continue at 902-906. Note that the second edge need not be consecutive with the first edge, but rather can be a predetermined number of state changes removed from the first rising or falling edge.

As shown in the first portion of FIG. 10, if a second rising edge occurs within the maximum acceptable time deviation 1002, the waveform pulse is considered to be a valid pulse. However, if the second rising edge occurs after the end of the maximum time window $T_{max}$ (i.e., outside of the maximum acceptable time deviation 1002), then an error is detected. In the example of FIG. 10, the error occurs because the monitored I/O signal is too long.

Figure 11:
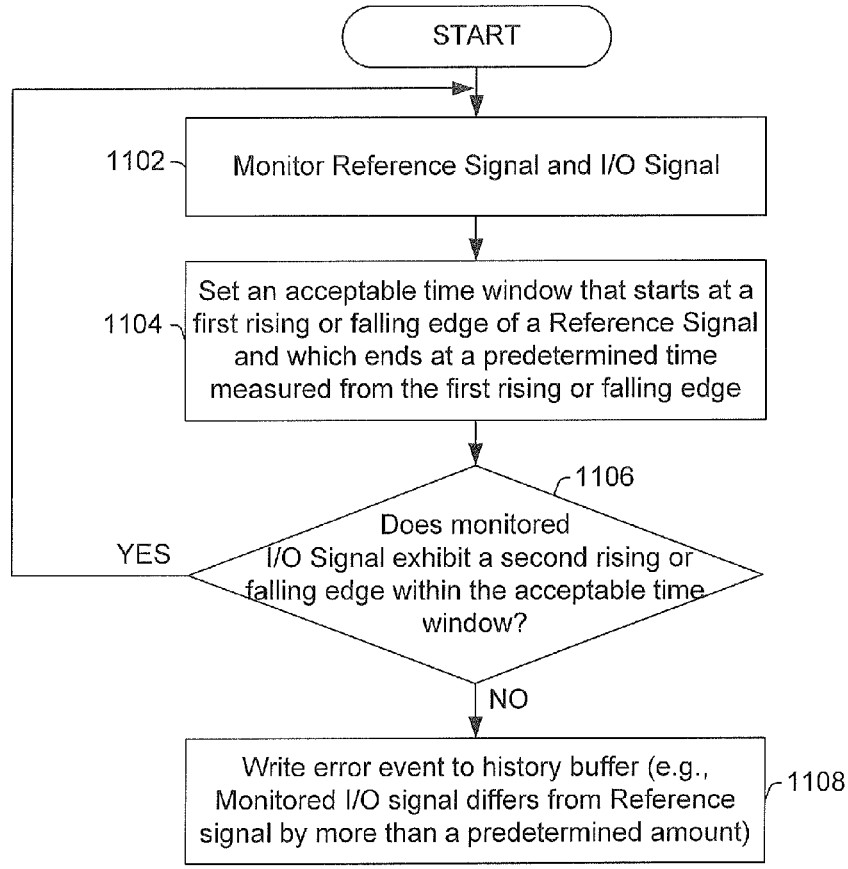
FIG. 11 is a flow chart depicting a method in which an I/O signal and reference signal are compared using a time window as measured from a rising or falling edge in accordance with some embodiments.
Figure 12:
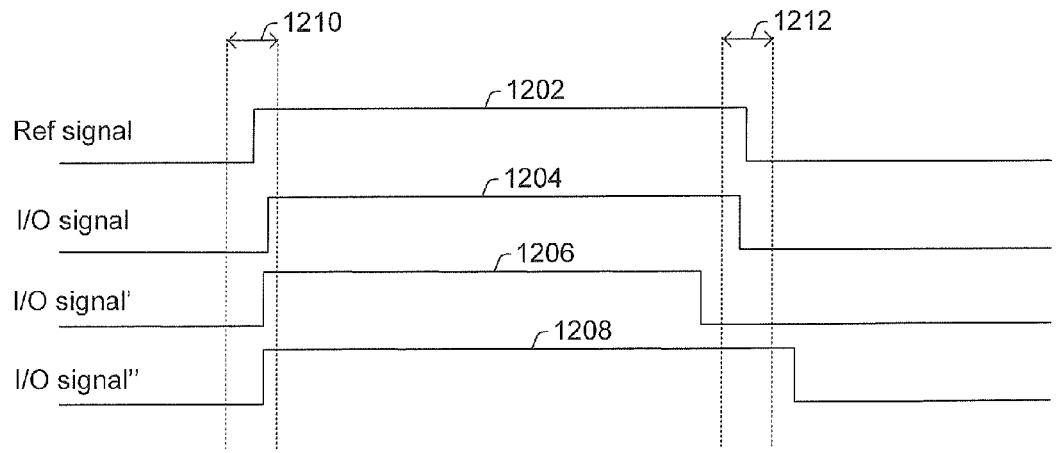
FIG. 12 shows some example waveforms to illustrate FIG. 11's flowchart.

FIGS. 11-12 relate to a method 1100 that compare an I/O signal to a reference signal by using a time window.

At 1102 (FIG. 11), an I/O signal and a reference signal are monitored.

At 1104, the method 100 sets an acceptable time window that starts at a first rising or falling edge of the reference signal and which ends at a predetermined time measured from the first rising or falling edge. The end of the time window corresponds to a maximum acceptable time deviation from an expected I/O signal.

At 1106, the method determines whether the monitored I/O signal exhibits a second rising or falling edge within the acceptable time window. If so ("YES" at 508), it is assumed there is no error and monitoring continues. If not ("NO" at 508) an error signal is asserted.

For illustration, FIG. 12 shows a reference signal 1202 and several different examples of an I/O signal (1204, 1206, 1208). On edges of the reference signal, time windows (e.g., 1210, 1212) are opened. The edges of a given time window can be spaced (e.g., equally or non-equally) about the corresponding reference signal edge, and correspond to a maximum acceptable time deviation from the reference signal. In some instances (not-illustrated in FIG. 12), an edge of the time window can be aligned to the reference signal.

The edges of the first I/O signal 1204 fall within the time windows. Thus, signal 1204 is assumed to be error-free.

The first edge of the second I/O signal 1206 also falls within time window 1210. However, the second edge of the second I/O signal 1206 occurs before the start of the time window 1212. Thus, the second edge of the second I/O signal 1206 occurs too early, and an error signal can be asserted.

The first edge of the third I/O signal 1208 again falls within time window 1210. However, the second edge of the second I/O signal 1206 occurs after the start of the time window 1212. Thus, the second edge of the second I/O signal 1206 occurs too late, and an error signal can be asserted.

Figure 13:
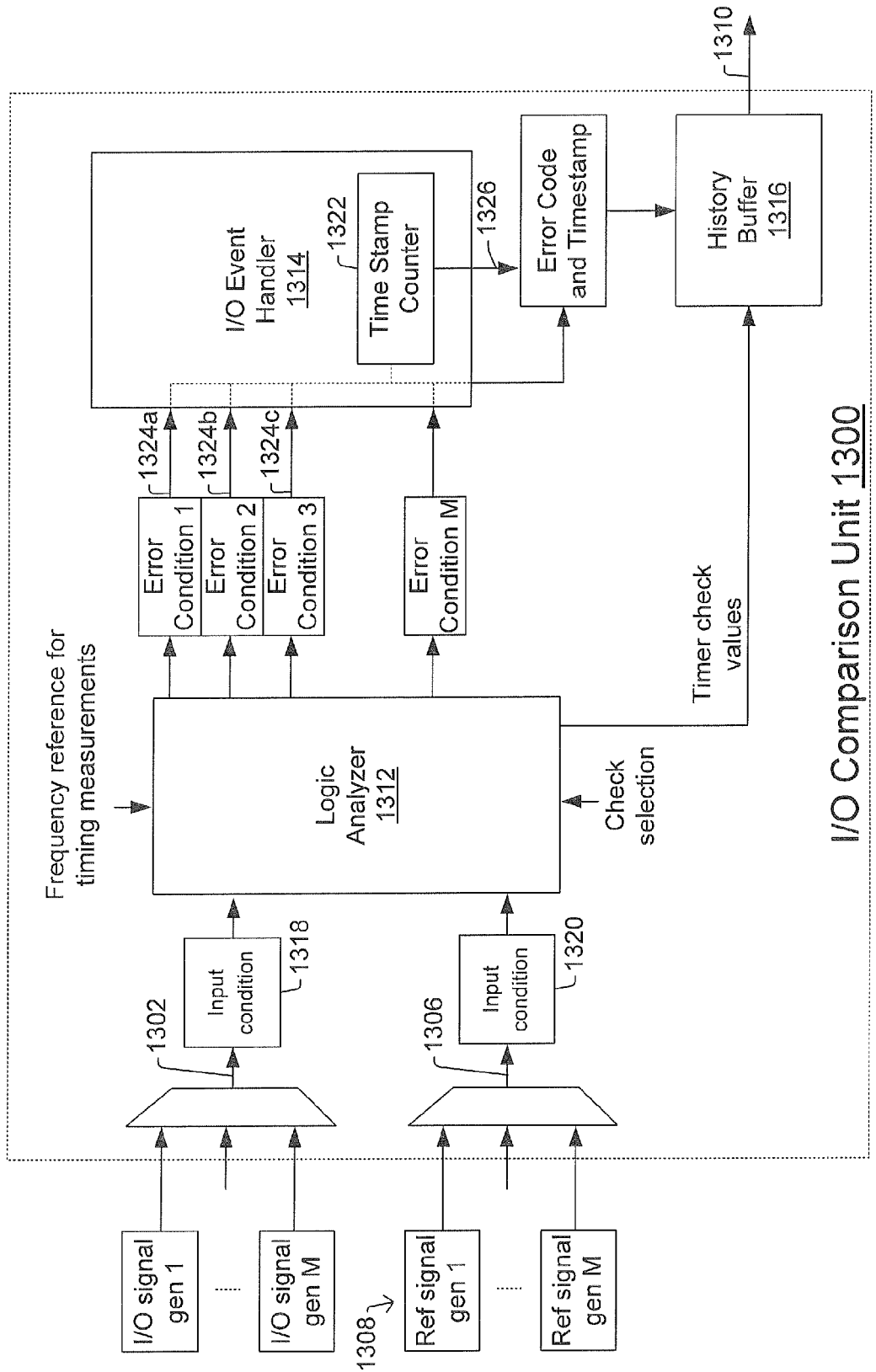
FIG. 13 is a diagram illustrating an I/O comparison unit.

Referring now to FIG. 13, one can see another example of an I/O comparison unit 1300. Like many previously discuss embodiments, FIG. 13's I/O comparison unit 1300 compares an I/O signal 1302 from one of several I/O signal generators 1304 to a reference signal 1306 from one of several reference signal generators 1308, and selectively asserts an error signal 1310 (e.g., an interrupt on a dedicated interrupt line) based on whether the I/O signal 1302 and reference signal 1304 exhibit a predetermined relationship. A logic analyzer 1312, I/O event handler 1314, and history buffer 1316 are operably coupled as shown to facilitate this functionality.

During operation, a first input condition module 1318 (e.g., first glitch filter) processes the I/O signal 1302, and a second input condition module 1320 (e.g., second glitch filter) processes the reference signal 1306. The processed signals are then examined by the logic analyzer 1312 to determine whether the I/O signal 1302 exhibits one or more of various error conditions relative to the reference signal 1306. For example, the logic analyzer 1312 can determine whether the I/O signal 1302 has a pulse length that is longer or shorter than that of the reference signal 1306 (e.g., with reference to a pre-specified pulse length within the pulse length is required to fall), or can determine whether the I/O signal 1302 has a higher or lower frequency than that of the reference signal 1306. The logic analyzer 1312 can then output respective error codes or error conditions (1324*a*, 1324*b*, . . . ) indicative of any errors that were detected.

The I/O event hander 1314, which includes a timestamp counter 1322, outputs respective timestamp values 1326 at respective times corresponding to respective error conditions. In this way, an error code and corresponding timestamp are provided to the history buffer 1316. Thus, a timestamp for a given error condition indicates when the error condition occurred.

The history buffer 1316 receives the error code and timestamp from the I/O event handler 1314, as well as timer check values from the logic analyzer 1312. The timer check values often provide further details corresponding to a given error event. As a concrete example, consider a case where a maximum pulse length of the I/O signal is required to be no longer than 10 ms, which is the duration of the reference signal. At time t1, the logic analyzer measures an I/O signal pulse length that exceeds 10 ms. Consequently, the logical analyzer asserts error condition 1. The I/O event handler records that error condition 1 occurred at a time stamp value of t1. The error condition and the corresponding time stamp are then stored in the history buffer. To help elucidate the characteristics of the particular error event, the timer check values can specify the particular starting time and ending time of the I/O pulse that caused the error. In this way, an accurate recordation of the error event is stored. The history buffer can also include sufficient logic to analyze the recorded error events and selectively assert the error signal 1310 in selected instances.

Although the disclosure has been shown and described with respect to one or more implementations, equivalent alterations and modifications will occur to others skilled in the art based upon a reading and understanding of this specification and the annexed drawings. For example, although I/O signals have been discussed in some examples above in the context of automotive applications, it will be appreciate that I/O signals can relate to practically any type of signal, including timer output signals and communication signals (e.g., SPI lines, UART outputs, CAN lines, etc.) The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A processing system, comprising:
   a memory unit to store a plurality of operating instructions;
   a processing unit coupled to the memory unit, wherein the processing unit is adapted to execute logical operations corresponding to respective operating instructions;
   an input/output (I/O) interface to receive a first time-varying waveform and to provide an I/O signal that is based on the first time-varying waveform;
   a comparison unit coupled to the processing unit and adapted to selectively assert an error signal based on whether the I/O signal has a predetermined relationship with a reference signal, wherein the predetermined relationship holds true during normal operation but fails to hold true when an unexpected event occurs and causes an unexpected change in at least one of the I/O signal and reference signal; and
   an interrupt line operably coupled to the comparison unit and operable to carry an interrupt request that is based on the error signal, wherein in the absence of an unexpected event, the comparison unit encounters multiple consecutive edges of the first time-varying waveform without asserting the interrupt request.

2. The processing system of claim 1, wherein the memory unit, processing unit, and comparison unit are all disposed on a single integrated circuit (IC).

3. The processing system of claim 2, wherein the first time-varying waveform is received on a first external pin of the IC, the first external pin being coupled to a first signal generator that is external to the IC.

4. The processing system of claim 2, wherein the IC further comprises:
   a reference block adapted to generate a second time-varying waveform on which the reference signal is based.

5. The processing system of claim 1, wherein the comparison unit provides the error signal to the processing unit as an interrupt request via the interrupt line.

6. The processing system of claim 1, wherein the interrupt line is coupled to an external pin of the IC, thereby allowing an external circuit block to monitor the external pin to determine whether the error signal is asserted even if the processing unit is busy or unavailable to process the error signal.

7. The processing system of claim 1, further comprising:
   a second I/O interface to receive a second time-varying waveform on which the reference signal is based,
   wherein the second time-varying waveform is generated by a second signal generator.

8. The processing system of claim 1, further comprising:
   a history buffer to store a plurality of comparison results indicating whether a plurality of respective comparisons between the I/O signal and the reference signal exhibit the predetermined relationship.

9. The processing system of claim 8, further comprising:
   analysis circuitry to analyze the comparison results within a given time interval or within a given number of comparisons, and to selectively assert the error signal based on analysis of the comparison results.

10. The processing system of claim 1, wherein the comparison unit comprises:
    analysis circuitry to selectively determine whether the I/O signal and the reference signal exhibit the predetermined relationship by setting a time window measured from an edge of the reference signal, and determining whether the I/O signal has a corresponding edge within the time window.

11. A processing system, comprising:
    a memory unit to store a plurality of operating instructions;
    a processing unit coupled to the memory unit, wherein the processing unit is adapted to execute logical operations corresponding to respective operating instructions;
    an input/output (I/O) interface to receive a first time-varying waveform and to provide an I/O signal that is based on the first time-varying waveform;
    a comparison unit coupled to the processing unit and adapted to selectively assert an error signal based on whether the I/O signal has a predetermined relationship with a reference signal, wherein the predetermined relationship holds true during normal operation but fails to hold true when an unexpected event occurs and causes an unexpected change in at least one of the I/O signal and reference signal;
    wherein the comparison unit comprises analysis circuitry to set a time window that starts at a rising or falling edge of the reference signal and which ends at a predetermined time measured from the rising or falling edge, wherein the analysis circuitry selectively asserts the error signal based on whether the I/O signal changes its state in a predetermined manner with respect to the time window; and
    wherein the error signal is selectively asserted based on whether at least one of a predetermined number of state changes for the I/O signal occurs beyond the end of the time window.

12. A processing system, comprising:
    a memory unit to store a plurality of operating instructions;
    a processing unit coupled to the memory unit, wherein the processing unit is adapted to execute logical operations corresponding to respective operating instructions;
    an input/output (I/O) interface to receive a first time-varying waveform and to provide an I/O signal that is based on the first time-varying waveform;
    a comparison unit coupled to the processing unit and adapted to selectively assert an error signal based on whether the I/O signal has a predetermined relationship with a reference signal, wherein the predetermined relationship holds true during normal operation but fails to hold true when an unexpected event occurs and causes an unexpected change in at least one of the I/O signal and reference signal; and
    wherein the comparison unit comprises analysis circuitry to selectively determine whether the I/O signal and the reference signal exhibit the predetermined relationship by integrating a difference between a current or voltage level of the I/O signal and a current or voltage level of the reference signal, and monitoring whether the integrated difference falls within an expected window that is bound by upper and lower integration thresholds.

13. The processing system of claim 12, wherein the analysis circuitry asserts the error signal if the integrated difference exceeds the upper integration threshold or falls below the lower integration threshold.

14. A processing system, comprising:
    a memory unit to store a plurality of operating instructions;
    a processing unit coupled to the memory unit, wherein the processing unit is adapted to execute logical operations corresponding to respective operating instructions;

an input/output (I/O) interface to receive a first time-varying waveform and to provide an I/O signal that is based on the first time-varying waveform;

a comparison unit coupled to the processing unit and adapted to selectively assert an error signal based on whether the I/O signal has a predetermined relationship with a reference signal, wherein the predetermined relationship holds true during normal operation but fails to hold true when an unexpected event occurs and causes an unexpected change in at least one of the I/O signal and reference signal;

wherein the comparison unit comprises a logic analyzer to compare the I/O signal and the reference signal and to selectively output at least one of a plurality of error conditions based on the comparison; and an I/O event handler to receive the at least one error condition and to associate a timestamp with the at least one error condition.

15. The processing system of claim 14, further comprising:
a history buffer to store the at least one error condition along with the timestamp.

16. The processing system of claim 15, wherein the logic analyzer provides data values that triggered the at least one error condition, and wherein the data values are stored in the history buffer along with the at least one error condition and the timestamp.

17. A processing system, comprising:
a first signal generator to provide a first time-varying waveform to or from an automotive load;

a second signal generator to provide a reference signal, wherein the reference signal is independent of the first time-varying waveform but is expected to correspond to the first-time varying waveform as provided to or from the automotive load; and an I/O comparison unit to receive the reference signal and to receive an I/O signal which corresponds to the first time-varying waveform as actually received at the load, wherein the I/O comparison unit is configured to selectively assert an error signal based on whether the I/O signal has a predetermined relationship with the reference signal, wherein the predetermined relationship holds true during normal operation but fails to hold true when an unexpected event occurs and causes an unexpected change in at least one of the I/O signal and reference signal.

18. The processing system of claim 17, wherein the I/O comparison unit comprises:
analysis circuitry to selectively determine whether the I/O signal and the reference signal exhibit the predetermined relationship by integrating a difference between a current or voltage level of the I/O signal and a current or voltage level of the reference signal, and monitoring whether the integrated difference falls within an expected window that is bound by upper and lower integration thresholds.

19. The processing system of claim 17, further comprising:
an interrupt line operably coupled to the I/O comparison unit and operable to carry an interrupt request that is based on the error signal.

20. The processing system of claim 19, wherein in the absence of an unexpected event, the I/O comparison unit encounters multiple consecutive edges of the first time-varying waveform without asserting the interrupt request.

21. The processing system of claim 17, wherein the comparison unit comprises:
a logic analyzer to compare the I/O signal and the reference signal and selectively output at least one of a plurality of error conditions based on the comparison.

22. The processing system of claim 21, further comprising:
an I/O event handler to receive the at least one error condition and to associate a timestamp with the at least one error condition.

* * * * *